Patented May 13, 1952

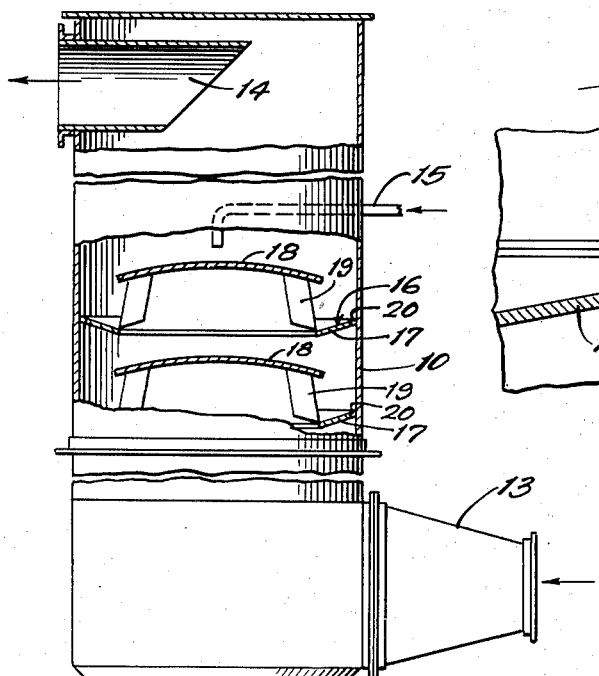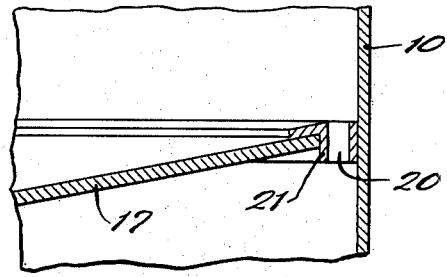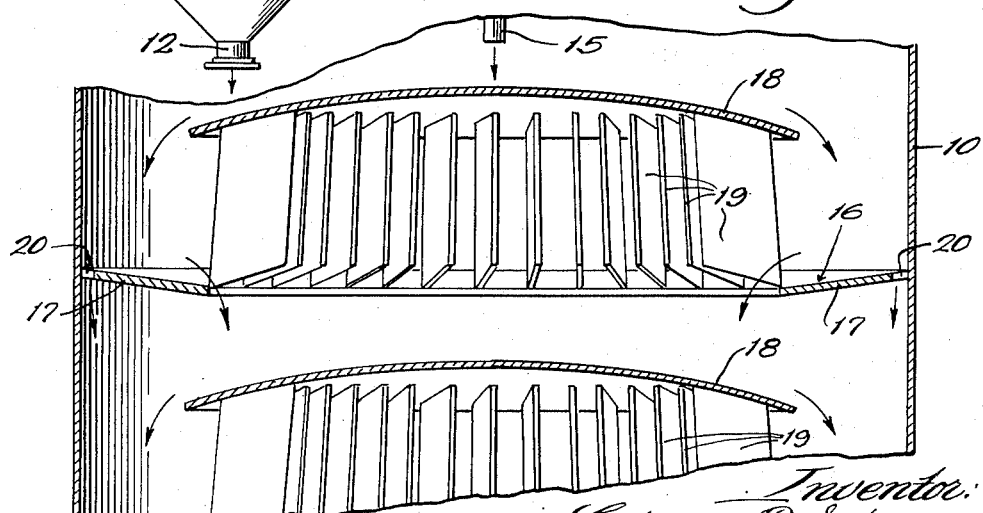

2,596,104

UNITED STATES PATENT OFFICE 2,596,104

COLUMN APPARATUS

Claude B. Schneible, Detroit, Mich.

Application November 22, 1947, Serial No. 787,533

5 Claims. (Cl. 261—79)

This invention relates to column and tower apparatus, and more particularly to intimate contact equipment for the purpose of creating an intimate contact between liquid or gas, or vapor, or both.

In columns and towers heretofore used in which a liquid was passed countercurrent to gases or vapors, considerable difficulty was experienced in thoroughly contacting a large amount of liquid. The liquid, in such prior practice, meeting the rotating annulus of gas or vapor, was broken into fine particles or atomized to create an intimate contact. The liquid volume is therefore restricted by the atomizing ability of the gas or vapor. At a low gas (vapor) velocity, the atomization is not satisfactory, and at too high a velocity, the entrainment is too great. There is, therefore, a fixed relation between the weight of the liquid and the velocity of the gas or vapor.

Practice shows that in many applications, it is desirable to circulate a greater quantity of liquid than the apparatus can atomize, and it is one purpose of this invention to provide apparatus capable of circulating such greater quantity of liquid. A further object is to provide apparatus in which liquid is brought into intimate contact with gases or vapor, while at the same time providing means for circulating liquid through the apparatus which is greater than the apparatus can atomize. A still further object is to provide means for passing an excess of liquid downwardly through the column in a quantity greater than the apparatus can atomize, while at the same time bringing the liquid in at lower spaced points at which the liquid is finally atomized. Yet another object is to provide apparatus in which the amount of liquid by-passed from the atomization zones can be effectively controlled or regulated. A still further object is to provide means whereby a body of liquid is provided in quantity at different stages throughout a column for the purpose of diluting the liquid being atomized and for preventing crystallization of acids, alkalies, and other materials. Other specific objects and advantages will appear as the specification proceeds.

The invention is illustrated, in a preferred embodiment, by the accompanying drawing, in which—

Figure 1 is a broken vertical sectional view of apparatus embodying my invention; Fig. 2, an enlarged broken vertical sectional view; and Fig. 3, a detail sectional view showing a plug member for controlling the rate of flow about the ring.

In the illustration given, 10 designates a casing providing an elongated vertical chamber. The casing is provided at its bottom with a conical outlet portion 11 and with an outlet pipe 12. An inlet pipe 13 for the incoming gases or vapors is provided, and the inlet is preferably tangential to the cylindrical body of the casing, as shown more clearly in my Patent No. 2,114,786, dated April 19, 1938.

The casing is also provided at the top with an outlet pipe 14. A liquid pipe 15 is employed for introducing water or other liquid into the interior of the chamber.

Within the casing 10, I provide a number of baffles 16 over which the water has flowed. In the specific illustration given, each baffle comprises a ring 17, plate 18, and vanes 19 between the ring and plate, all as shown in greater detail in my said Patent No. 2,114,786. The vanes 19 are inclined so that as the gases or vapors are drawn upwardly under suction, the gases or vapors are caused to form a rotating annulus in the area around and above the vanes. The descending liquid is broken into fine particles by contact with the rotating annulus.

In the illustration given, the rings 17 are spaced from the casing 10 so as to provide vertical flow passages 20 through which the liquid may pass downwardly around the rings 17. It will be understood that any suitable means for by-passing liquid around the vanes may be employed. In the specific illustration given, the ring 17 is welded to the casing 10 at intervals and slots forming the passage 20 extend between the welded points.

The construction shown is advantageous because the liquid which is thrown against the wall 10 tends to fall downwardly along the wall and thus passes readily through the openings 20 without becoming atomized by the rising stream of gas or vapor. If desired, however, the openings 20 may be formed inwardly at the edge in the rings.

In the operation of the structure, liquid, such as water, oil, solvent, or any other treating fluid that is to be used, enters through pipe 15 and is discharged downwardly through its outlet, as shown in Fig. 1, upon the top of the plate below. The curved top of the plate causes the liquid to be deflected toward the walls of the casing 10. Part of the liquid meets the rising and rotating stream of air and is atomized thereby. Another portion, and a substantial portion, strikes the wall casing and remains upon the casing, flowing downwardly and passing through the passages 20. Thus, there is supplied to the baffle below and to the succeeding baffles, a stream of water which has not been atomized and which flows along the column wall. As the water reaches the lower baffle, it is again divided, part flowing through the by-pass passage 20 therein and a part of it again being atomized by the rotating annulus. Any number of baffles may be employed, and the size of the openings or passages 20 in the various baffles may be varied as desired.

In the foregoing operation, it will be understood that the inlet pipe 13 is connected to a conduit leading from a source of medium, and that the outlet pipe 14 is connected to a conduit leading to an exhaust blower, etc. If desired, however, the medium may be passed through the column by means of pressure rather than by suction. It will be understood that the drain outlet pipe 12 is connected to a conduit, which may be closed or which may lead to a separator or other container.

The apparatus is highly effective for temperature reduction, for dust-fine collecting, and for the treatment of chemicals, and, in fact, is useful in any operation in which it is desired to have a liquid make intimate contact with gases or vapors.

In the illustration given in Fig. 3, the flow passage 20 is partially filled with a plug or insert tube 21, the tube 21 providing a more restricted outlet. By placing inset tubes or plugs of varying sizes within the passages 20, an effective control of the quantity of liquid to be by-passed may be maintained. It will be understood that any other suitable means for varying the size of the openings 20 may be employed so as to control the flow of liquid therethrough. In the specific illustration given, the plugs 21 are preferably in segmental form so as to fit between the points at which the ring is welded to the casing 10.

By the terms "gas" or "gases," as used in the accompanying claims, I intend to employ the term in its broader meaning to include vapors as well as gases.

While in the foregoing specification, I have set forth a specific structure in great detail for the purpose of illustrating specific modes of carrying out the invention, it will be understood that such details may be varied widely by those skilled in the art without departing from the spirit of my invention.

I claim:

1. In a column of the character set forth wherein a gas is caused to move upwardly in an annular pattern, a casing providing an elongated chamber having an inlet at one end and an outlet adjacent the other, baffles extending across said chamber at spaced intervals, said baffles comprising rings, plates spaced from said rings and extending inwardly thereof, and vanes between the spaced rings and plates, said plates being inclined downwardly at an angle which necessarily directs liquid upon the casing above said rings, said rings providing normally open vertical openings therethrough immediately adjacent to said casing adapted to permit streams of liquid to flow downwardly continuously along the inner walls of said casing past said rings, and means for discharging liquid upon said baffles.

2. In a column of the character set forth wherein a gas is caused to move upwardly in a rotating spiral, a casing providing a vertical chamber having an inlet at its lower end and an outlet adjacent its upper end, baffles extending across said chamber in spaced relation, said baffles comprising rings adjacent said casing, centrally located plates, and vanes between the spaced rings and plates, said plates having a downward convexity sufficient to direct liquid upon the casing above said rings, said rings being provided also with normally open vertical by-pass passages immediately adjacent to said casing adapted to permit streams of liquid to flow downwardly continuously along the inner walls of said casing past said rings, and means for discharging liquid onto said baffles, whereby liquid flowing along the wall of said casing and through said by-pass passages is continually re-mixed with liquid flowing over said rings and through said vanes.

3. In a column of the character set forth wherein a gas is caused to move upwardly in a rotating spiral, a casing providing a vertical chamber, baffles supported in spaced relation in said chamber and comprising spaced rings and plates with vanes therebetween, and means for discharging liquid onto said baffles, said plates being curved downwardly so as to necessarily direct said liquid upon the casing above said rings, and said rings being provided with normally open vertical by-pass openings therethrough immediately adjacent to said casing adapted to permit streams of liquid to flow downwardly continuously along the inner walls of said casing past said rings, whereby liquid flowing along the wall of said casing and through said by-pass passages is continually re-mixed with liquid flowing over said rings and through said vanes.

4. In a column for the intimate contact of liquids wherein a gas is caused to rise upwardly in an annular pattern to atomize a downwardly flowing liquid, a vertical casing providing an elongated chamber having a tangential inlet at one end and an outlet adjacent the other, baffles extending across said chamber at spaced intervals including vanes adapted to rotate gases passing therethrough, said baffles being provided immediately adjacent said casing with rings having normally open vertical by-pass openings adapted to permit streams of liquid to flow downwardly continuously along the inner walls of said casing past said rings, means for discharging liquid onto said baffles, means above said vanes for necessarily directing said liquid onto the casing above said rings provided with by-pass openings, and control means for regulating the size of said by-pass openings.

5. In a column for the intimate control of liquids with gases wherein a gas is caused to rise upwardly in an annular pattern to atomize a downwardly flowing liquid, a vertical casing providing an elongated chamber having a tangential inlet at one end and an outlet adjacent the other, baffles extending across said chamber at spaced intervals including vanes adapted to rotate gases passing therethrough, said baffles also including rings with normally open vertical by-pass openings immediately adjacent said casing adapted to permit streams of liquid to flow downwardly continuously along the inner walls of said casing past said rings, means for discharging liquid onto said baffles, means above said vanes for necessarily directing said liquid onto the casing above said rings provided with by-pass openings, and apertured plugs adapted to be received within said by-pass openings to reduce the size thereof.

CLAUDE B. SCHNEIBLE.

REFERENCES CITED

The following references are of record in the file of this patent:

UNITED STATES PATENTS

| Number | Name | Date |
|---|---|---|
| 1,471,101 | Cleary | Oct. 16, 1923 |
| 1,783,813 | Schneible | Dec. 2, 1930 |
| 1,894,744 | Hawley | Jan. 17, 1933 |
| 1,922,259 | Paradise | Aug. 15, 1933 |
| 2,114,786 | Schneible | Apr. 19, 1938 |
| 2,259,033 | Fisher | Oct. 14, 1941 |
| 2,409,088 | Weits et al. | Oct. 8, 1946 |

FOREIGN PATENTS

| Number | Country | Date |
|---|---|---|
| 290,553 | Great Britain | May 10, 1928 |